(12) United States Patent
Edwards et al.

(10) Patent No.: US 10,771,264 B2
(45) Date of Patent: Sep. 8, 2020

(54) SECURING FIRMWARE

(71) Applicant: HEWLETT PACKARD ENTERPRISE DEVELOPMENT LP, Houston, TX (US)

(72) Inventors: Nigel Edwards, Bristol (GB); Ludovic Emmanuel Paul Noel Jacquin, Bristol (GB); Thomas Laffey, Roseville, CA (US); Theofrastos Koulouris, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 58 days.

(21) Appl. No.: 16/155,983

(22) Filed: Oct. 10, 2018

(65) Prior Publication Data

US 2020/0119929 A1    Apr. 16, 2020

(51) Int. Cl.
*H04L 29/06* (2006.01)
*H04L 9/32* (2006.01)
*G06F 21/57* (2013.01)
*H04L 9/06* (2006.01)

(52) U.S. Cl.
CPC .......... *H04L 9/3265* (2013.01); *G06F 21/572* (2013.01); *H04L 9/0643* (2013.01); *H04L 2209/38* (2013.01)

(58) Field of Classification Search
CPC . H04L 9/3265; H04L 9/0643; H04L 2209/38; G06F 21/572
See application file for complete search history.

(56) References Cited

U.S. PATENT DOCUMENTS

| | | | |
|---|---|---|---|
| 8,060,934 B2 | 11/2011 | Cabuk et al. | |
| 8,555,049 B2 | 10/2013 | Takayama et al. | |
| 8,589,667 B2 | 11/2013 | Mujtaba et al. | |
| 8,732,444 B2 | 5/2014 | Nicolson et al. | |
| 10,031,993 B1* | 7/2018 | Poornachandran | G06F 12/0246 |

(Continued)

FOREIGN PATENT DOCUMENTS

| EP | 2378454 A2 | 10/2011 |
|---|---|---|
| WO | 20171100303 A1 | 6/2017 |

OTHER PUBLICATIONS

"Implicit Identity Based Device Attestation", Trusted Computing Group, Version 1.0, Revision 0.93, Mar. 5, 2018, 18 pages.

(Continued)

*Primary Examiner* — Mahfuzur Rahman
(74) *Attorney, Agent, or Firm* — Nolte Intellectual Property Law Group (57) ABSTRACT

A method for secure data protection includes generating a firmware digital certificate for a layer of firmware. The firmware operates a hardware component of a compute node. The firmware digital certificate is an attribute certificate. The firmware digital certificate includes a cumulative hash of the layer of firmware and a nonce. The cumulative hash includes a concatenation of a hash of the layer of firmware and a hash of each one or more lower layers of the firmware. The method includes authenticating the layer of firmware using a trusted data store. The trusted data store includes a binary image of an expected layer of firmware and a certificate chain comprising the hardware digital certificate and the firmware digital certificate.

18 Claims, 9 Drawing Sheets

(56) References Cited

U.S. PATENT DOCUMENTS

| | | | |
|---|---|---|---|
| 2012/0047555 A1* | 2/2012 | Xiao | H04L 9/3247 |
| | | | 726/1 |
| 2013/0298192 A1* | 11/2013 | Kumar | G06F 21/52 |
| | | | 726/3 |
| 2017/0187699 A1* | 6/2017 | Gillmore | H04L 63/062 |
| 2017/0187831 A1* | 6/2017 | Otting | H04W 12/009 |
| 2017/0308704 A1 | 10/2017 | Ray et al. | |
| 2018/0082065 A1 | 3/2018 | Liu et al. | |
| 2019/0052617 A1* | 2/2019 | Chen | H04L 9/088 |

OTHER PUBLICATIONS

"PCI Express Device Security Enhancements", Intel, version 0.7, Jun. 2018, 45 pages.

A Practical Guide to TPM 2.0, W. Arthur, D. Challener, ApressOpen, 2015, 375 pages.

Bormann et al., Concise Binary Object Representation (CBOR), RFC 7049, IETF, Oct. 2013, 54 pages.

Gen-Z, "Gen-Z Core Specification 1.0 Enables Silicon Development", available online at <https://genzconsortium.org/gen-z-consortium-announces-the-public-release-of-its-core-specification-1-0/>, Version 1.0, Gen-Z Consortium, Feb. 13, 2018, 4 pages.

International Telecommunication Union, "Series X: Data Networks, Open System Communications and Security", X.509, International Telecommunications Union, Oct. 2016, , 8 pages.

Proudler et al., "Trusted Computing Platforms", TPM2.0 in Context, 2015, 2 pages.

Universal Serial Bus Type-C Authentication Specification, Revision 1.0, 2017, USB 3.0 Promoter Group, 17 pages.

Brian Lich et al., "How Windows 10 uses the Trusted Platform Module," Oct. 27, 2017, pp. 1-11 (online), Microsoft, Retrieved from the Internet on Aug. 28, 2018 at URL: <docs.microsoft.com/en-us/windows/security/information-protection/tpm/how-windows-uses-the-tpm>.

Extended European Search Report received for EP Patent Application No. 19202294.5, dated Feb. 21, 2020, 7 pages.

* cited by examiner

SECURING FIRMWARE

BACKGROUND

Within a chassis or enclosure of a compute node, a computer system or host, there may be hundreds of pluggable components, from temperature sensors and power supplies to memory modules and processors. Within a rack or a cluster of compute nodes, there may be thousands of such components. However, each component may represent a security vulnerability, i.e., a potential attack vector. A component may be a potential attack vector if the component is counterfeit or contains malware that may compromise the compute node. One potential way to infect a component with malware is to corrupt the firmware that is used to operate the component. Hence, identifying infected components is useful for preventing their use.

BRIEF DESCRIPTION OF THE DRAWINGS

The present disclosure may be understood from the following detailed description when read with the accompanying Figures. In accordance with the standard practice in the industry, various features are not drawn to scale. In fact, the dimensions of the various features may be arbitrarily increased or reduced for clarity of discussion.

Some examples of the present application are described with respect to the following figures.

DETAILED DESCRIPTION

Examples of authentication include universal serial bus (USB) Type C authentication, which enables a compute node, i.e., a host, to authenticate compliant USB components. USB Type C authentication also forms the basis for potential peripheral component interconnect express (PCIe) authentication mechanisms, which allow PCIe components to be authenticated. The pattern of authentication in USB Type C and PCIe is well-understood and can be extended to internal buses, and other protocols and interconnects.

The purpose of component authentication is to establish trust in the component. The authentication mechanisms discussed above may establish that a component is from a known and trusted manufacturer. However, establishing that a component is from a known and trusted manufacturer does not mean that the firmware running inside the component is correct and trustworthy. Being correct may mean that the correct firmware and the correct version of the firmware are installed in the component. Being trustworthy may mean that the firmware can be trusted not to breach the security of the component on which the firmware is running. Accordingly, examples of the present disclosure may provide component authentication mechanisms that measure and verify a component's firmware with firmware measurement certificates. A firmware measurement certificate may be similar to a digital certificate. Digital certificates are electronic documents that may be distributed by an issuing authority, which ensure the trustworthiness of a computer component, a compute node, and the like. However, instead of ensuring the trustworthiness of the firmware, the firmware measurement certificate may provide a measurement of the firmware that is loaded in memory for execution by the component and ensure that the measurement is accurate. The measurement in the firmware measurement certificate may be validated against a record indicating the version of the firmware that is expected to be installed on the component. Accordingly, if the measured firmware, recorded in the firmware measurement certificate, does not match the firmware that is expected to be installed on the component, examples may determine that the component is not trustworthy. Thus, using firmware measurement certificates, it may be possible to establish whether a component is from a known and trusted manufacturer, and whether the component is running correct and trustworthy firmware. Additionally, examples may allow for the firmware to be updated and still be authenticated with firmware measurement certificates.

Figure 1:
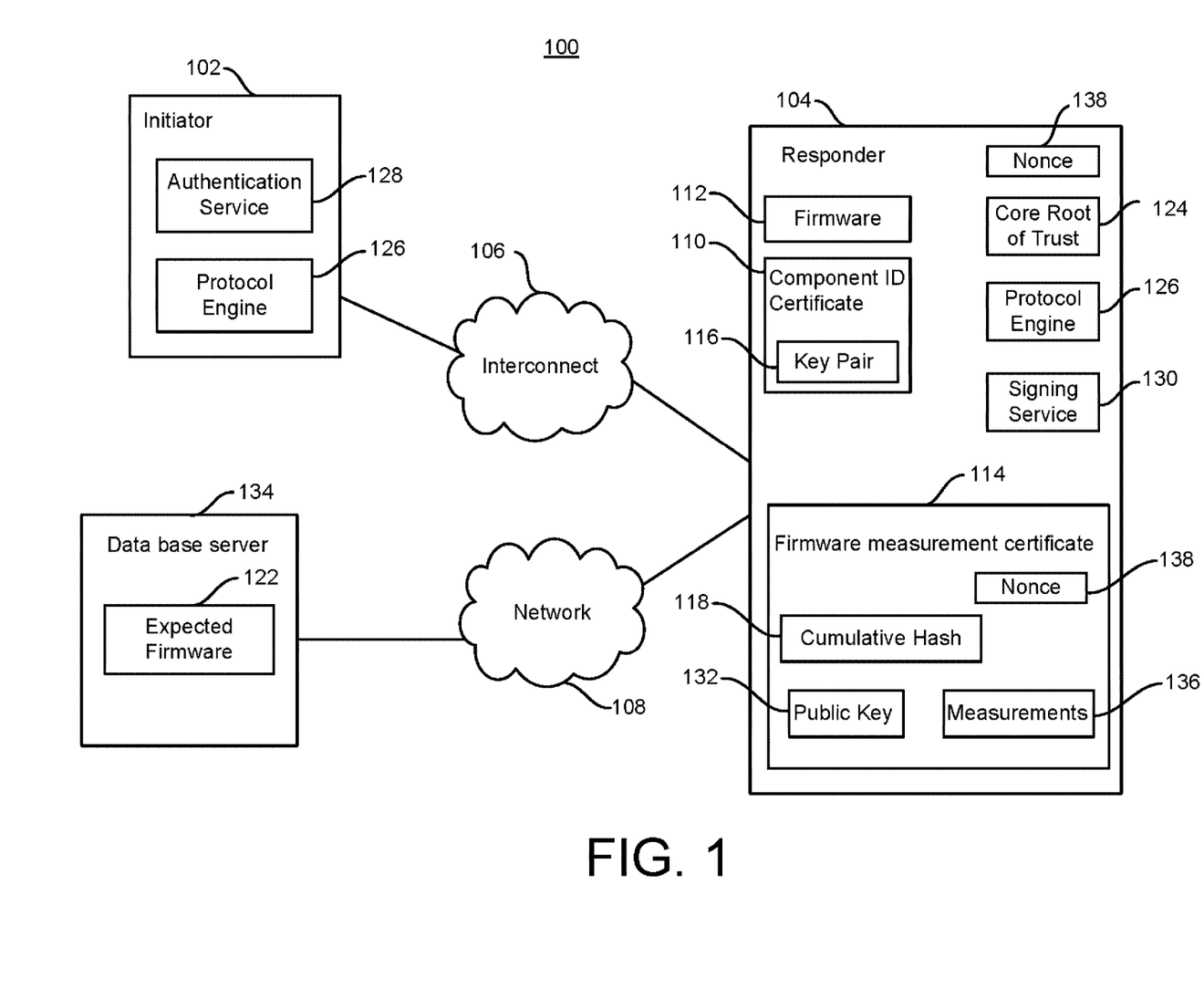
FIG. 1 is an example system for securing firmware.

FIG. 1 is an example system 100 for securing firmware. The system 100 includes multiple components, an initiator 102, in communication with a responder 104, over one or more interconnects 106. The initiator 102 may be a component of a compute node (not shown) that is preparing to use the responder 104 to perform a task. For example, the initiator 102 may be a general-purpose computer processor, and the responder 104 may be a network interface controller (NIC). Accordingly, the general-purpose computer processor initiator and NIC responder may be connected to, and communicate over, an interconnect 106, such as a PCIe interconnect. Additionally, the NIC responder may be connected to a network 108. The general-purpose computer processor initiator may be preparing to call the NIC responder to send sensitive information over the network 108 to another compute node (not shown). However, before trusting the responder 104 with potentially sensitive information, the initiator 102 may use an authentication service 128 to determine whether the responder 104 is trustworthy. In examples, the authentication service 128 may be a computer application that uses digital certificates under a public key infrastructure (PKI) to determine the trustworthiness of the responder 104. The responder 104 may not be trustworthy if a hacker or other malicious user has control. A malicious user may have control of the responder if the responder 104 is a counterfeit hardware component, or if the firmware 112 on the responder 104 is counterfeit.

The initiator 102 and responder 104 may reside on the same compute nodes and thus communicate over one interconnect 106, which passes messages between the initiator 102 and responder 104 based on a specific protocol. The interconnect 106 may include one or more interconnects, such as a USB, PCIe, Gen-Z, and the like. The initiator 102 and responder 104 may include protocol engines 126 that may ensure the messages between the initiator 102 and responder 104 are provided in a format that accords with the protocols of the relevant interconnects 106. In some implementations, the initiator 102 may use multiple protocol engines 126 to handle interconnections with different kinds of components, such as, a baseboard management controller (BMC) and a general-purpose computer processor. The initiator 102 and responder 104 may also reside on different compute nodes. In such a case, network components on the compute nodes may provide connection to the network 108, which may include an internet protocol network, such as a local area network, wide area network, and the Internet.

To determine whether the responder 104 is trustworthy, the initiator 102 may authenticate the responder 104 by validating the public-private key pairing of the responder's component identification (ID) certificate 110 to determine the hardware of the responder 104 is authentic, i.e., not a counterfeit. The component ID certificate 110 may be a public key certificate that attests to the identity of the manufacturer of the responder 104. Attesting to the identity of the responder's manufacturer may ensure that the hardware of the responder 104 is trustworthy. The component ID certificate 110 may be read by any entity wishing to authenticate the responder 104, such as the initiator 102. In examples, the initiator 102 may authentic the responder 104 by identifying the public key of the public-private key pair 116 and determining if the responder 104 is in possession of a private key corresponding to the public key. If the responder 104 is in possession of the private key, the initiator 102 may determine that the responders' hardware is trustworthy. The public key may be identified by verifying that the component ID certificate 110, or a chain of certificates, is signed by a trusted party. Once the public key may be trusted, the initiator 102 may challenge the responder 104 to prove possession of the corresponding private key. The challenge may involve having the responder 104 sign a nonce with the private key. A nonce may be a relatively large random number, e.g., 256 bits that is used only once. The initiator 102 may also apply an algorithm to the nonce using the public key and use the resultant value to determine if the nonce signed by the responder 104 is signed with the corresponding private key. If so, the initiator 102 may determine that the responder's hardware is trustworthy.

Additionally, the responder 104 includes firmware 112, which may be a computer application that performs the operations of the responder 104. For example, the NIC responder may operate a physical network, such as an Ethernet, wireless, or radio network. The NIC responder may also send and receive data packets from one compute node to another. Another example responder 104 may be a disk controller. The disk controller responder 104 may read data from, and write data to, a hard disk drive according to a storage device protocol, such as serial advanced technology attachment (SATA). The firmware 112 may include one or more layers, wherein each layer represents one computer application that executes in a specified sequence. Thus, operation of the responder is performed by executing the layers of the firmware 112 in this sequence. In examples, determining whether the responder 104 is trustworthy may also involve determining whether the firmware 112 is trustworthy. In such examples, the initiator 102 may determine whether the firmware 112 is trustworthy by validating one or more firmware measurement certificates 114 for the firmware 112.

The firmware measurement certificates 114 may be attribute certificates, which are digital documents that describe attributes that an issuer associates with the holder. In examples, the attributes described by the firmware measurement certificates 114 may be measurements of the binary image of the firmware 112 that is loaded into memory for execution. Attribute certificates may be associated with public key certificates, such as the component ID certificate 110. In this way, the firmware measurement certificates 114 may extend the certificate chain used for authentication of the responder 104. Thus, while the component ID certificate 110 may describe the identity of the manufacturer of the responder 104, the firmware measurement certificates 114 may describe properties of the firmware 112 being used to operate the responder 104. Similar to the component ID certificate 110, the firmware measurement certificates 114 may include a public key 132. The public key 132 may be part of a public-private key pair of mathematically-related keys for use in an asymmetric encryption scheme. In examples, the device identifier composition engine (DICE) architecture may provide an algorithm to generate public-private keys pairs for each firmware measurement certificate 114. Additionally, the firmware measurement certificates 114 may include a cumulative hash 118, which may represent a measure of the firmware 112 when loaded into the computer memory (not shown) for execution. In examples, the cumulative hash 118 may be compared to binary image of expected firmware 122 stored on a database server 134. In examples, the initiator 102 may cache measurements from the database server 134 for comparison to the firmware measurement certificates 114. The expected firmware 122 may be a binary image of the firmware that is installed on the responder 104 during manufacture, or during a legitimate update from the manufacturer. Thus, if the cumulative hash 118 does not match a cumulative hash of the expected firmware 122, the firmware 112 may not be trustworthy. Accordingly, the initiator 102 may decline to use the responder 104. In examples, the firmware measurement certificates 114 may be issued by the component being verified, i.e., responder 104, during the process of initialization (power-up) and possibly at other times. Accordingly, the firmware measurement certificates 114 may reside in, and be retrieved from, the responder 104. Alternatively, the firmware measurement certificates 114 may be temporarily stored in memory for caching after being retrieved from the responder 104. Because the firmware measurement certificates 114 are signed, they can be cached safely. Any tampering would invalidate the signature and therefore the firmware measurement certificate 114.

Each layer of the firmware 112 may be associated with one of the firmware measurement certificates 114. In some examples, each firmware measurement certificate 114 may include a unique public key 132. In such examples, a chain of firmware measurement certificates 114 may be created between the different layers of the firmware 112. In other words, a layer n, of the firmware 112 may certify the public key of the next layer, layer n+1. In turn, the layer n+1 uses the private key associated with the certified public key to sign the firmware measurement certificate 114 of layer n+2. In other examples, a single private-public key pair may be used for all layers of the firmware 112 on the responder 104. In such examples, the different layers of firmware 112 may be chained together by updating a cumulative hash 118 of the firmware measurement certificate 114 for each layer of the firmware 112. Accordingly, to verify the link between two layers of the firmware 112, the initiator 102 may compare the cumulative hash 118 of each layer's firmware measurement certificate 114.

In order to ensure their trustworthiness, the firmware measurement certificates 114 may be generated by a core root of trust 124. The core root of trust 124 may include non-updateable hardware or firmware installed by the original manufacturer of the responder 104, which can be trusted to create the firmware measurement certificate 114 that represents the actual measured binary image of the firmware 112. In examples, the firmware 112 may include multiple layers. Each layer may represent one portion of the computer instructions used to operate the responder 104. The layers may be executed in a prescribed sequence. Because the firmware 112 may include multiple layers, each layer may be susceptible to being compromised by a malicious user. Hence, the firmware measurement certificate 114 may be generated for each layer. To ensure the trustworthiness of the firmware measurement certificate 114 that is generated, the firmware measurement certificates 114 for each layer may be generated by an authenticated preceding layer. In an example responder 104 having multiple layers of firmware 112, the core root of trust 124 may generate a first firmware measurement certificate 114 representing the first layer of the firmware 112. Subsequently, prior to executing the second layer of firmware 112, the first layer may generate the firmware measurement certificate 114 for the second layer, thus ensuring the cumulative hash 118 for the second layer accurately represents the measured binary image of the second layer. Alternatively, the core root of trust 124 may generate a single firmware measurement certificate 114 that may be used to authenticate all the layers of the firmware 112.

Alternatively, a single firmware measurement certificate 114 may be used to authenticate multiple layers of firmware 114. Accordingly, a single firmware measurement certificate 114 may include measurements 136. The measurements 136 may represent a hash of the binary image for each layer of the firmware 112. Thus, there may be one measurement 136 for each layer of the firmware 112 up to the layer of the firmware 112 represented by the firmware measurement certificate 114. For example, if the firmware 112 includes layers, L0, L1, and L2, the measurements 136 for the firmware measurement certificate 114 may include three hashes: one hash for each of the binaries for layers, L0, L1, and L2.

Additionally, the firmware measurement certificate 114 may include a nonce 138. The nonce 138 may ensure the freshness of the measurements 136 and ensure that the core root of trust 124 is executed. The nonce 138 may be provided to the responder 104 by the initiator 102 during a challenge response protocol for authentication. Alternatively, the initiator 102 may write the nonce 138 to a specific memory location or register in the responder 104. Since the firmware measurement certificates 114 are generated at power-up or following a reset, the nonce 138 may be stored in a persistent location, such as in the responder 104. It is noted that for the first authentication of the responder 104, there may not be a nonce 138 available for the firmware measurement certificate 114. However, after the first authentication, the initiator 102 may provide the nonce 138, which may be written to persistent storage in the responder 104.

The responder 104 may include a signing service 130 and a protocol engine 126. The signing service 130 may provide a secure store. Examples of signing services include a trusted platform module and a field-programmable gate array. A trusted platform module may be a security co-processor that operates in response to a prescribed set of commands that may be used to securely store data, including the operating state of a computing platform, such as the compute node. A field-programmable gate array (FPGA) may be an integrated circuit that can be programmed using a hardware description language to perform specific instructions. In this way, an FPGA is similar to the processor. In contrast however, the processor may additionally be pre-programmed with a complex instruction set.

Figure 2:
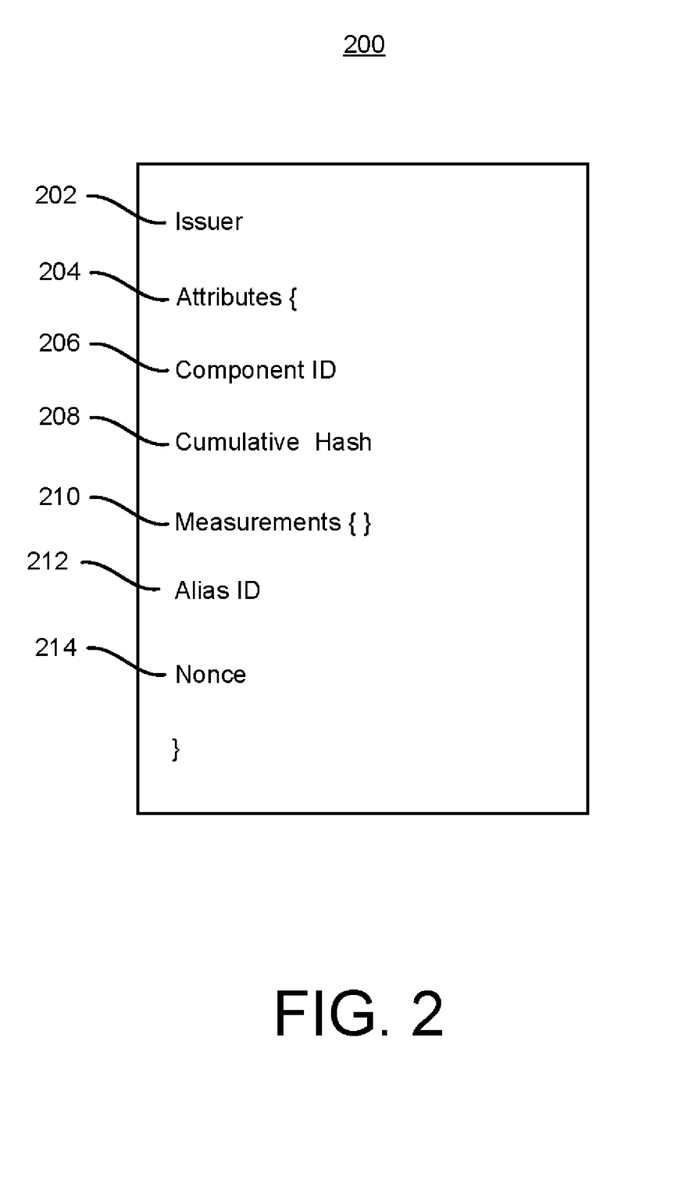
FIG. 2 is an example firmware measurement certificate for securing firmware.

FIG. 2 is an example firmware measurement certificate 200 for securing firmware 112. The firmware measurement certificate 200 may include an issuer 202 and attributes 204. The issuer 202 may be the name of this issuer. This name may be associated with a public key by a certificate that is signed by a certificate issued to the issuer, with the root being self-signed. The root certification authority key has to be known. There is no higher authority than the root certification authority, which represents the trust anchor known to the initiator 102. When identity certificates are used for a web browser, the web browser provider may configure trust anchors into the web browser before releasing it for general use. Similarly, the initiator 102 may have trust anchors, i.e., one or more known root certification authorities that the manufacturer of the initiator trusts. The signature may be applied to the whole certificate but is a separate structure (not shown). In examples, the issuer 202 may represent the core root of trust 124 or a specific layer of firmware 112. The attributes 204 may include a component ID 206, a cumulative hash 208, measurements 210, an alias ID 212, and a nonce 214. Similar to the subject of an identity certificate, the alias ID 212 may be a public key that identifies the owner of the firmware measurement certificate 200. Further, the alias ID 212 may be authenticated by the initiator 102. In examples, the alias ID 212 may be rendered unusable to higher layers of the firmware 112. The component ID 206 identifies a public-private key pair that is used to sign first firmware measurement certificate in the hierarchy. The firmware measurement certificates 200 for multiple layers of firmware 112 may form a hierarchy, wherein each firmware measurement certificate 200 is issued by the alias ID in the firmware measurement certificate 200 for the previous layer of firmware 112. The component ID 206 may be used to sign the first firmware measurement certificate 200 in the hierarchy and subsequent firmware measurement certificates 200 may be signed by the previous alias ID 212. Further, the component ID 206 may not be accessible outside the core root of trust 124. The cumulative hash 208 may be cryptographic hash representation of all layers of firmware 112 up to the layer of firmware 112 being secured. An example equation for calculating the cumulative hash 208 over layers 0 through n of the firmware 112 is shown in Equation 1. In Equation 1, H_ represents a cumulative hash function, and H represents a hash function that is approved by the National Institute of Standards and Technology (NIST). Additionally, in Equation 1, the symbol, "∥" represents the concatenation of fields or functions.

$$H\_(L_0) = H(0 \| H(L_0))$$

$$H\_(L_n) = H(H\_(L_{n-1}) \| H(L_n)) \quad \text{EQUATION 1}$$

As stated previously, the firmware measurement certificate 200 may be generated by a non-updateable, trusted piece of hardware or firmware code, such as the core root of trust 124, which is run at the first stage of initializing the responder 104. The core root of trust 124 may measure the next layer or layers of firmware 112 by taking their cryptographic hash. Each measurement may contribute to the cumulative hash 208 and be included in the measurements 210. In examples, the alias ID 212 may be generated by the core root of trust 124 to authenticate the firmware measurement certificate 200. More specifically, the alias ID 212 may be generated based on the cumulative hash 208 or the measurements 210. The alias ID 212 may be used to sign the next layer. Accordingly, the alias ID 212 may be made available to the next layer of firmware 112 within the responder 104 once initialization is complete and used to digitally sign the subsequent next layer of the firmware 112. For example, an alias ID, ID1, may be made available to layer L1. The layer, L1, may measure layer L2, which may generate alias ID, ID2, and issue a firmware measurement certificate 200 that is signed using the alias ID, ID1. This signature certifies the measurement of layer L2's cumulative hash 208 and measurements 210, and alias ID2. The alias ID, ID2, may then be made available to layer L2.

Figure 3:
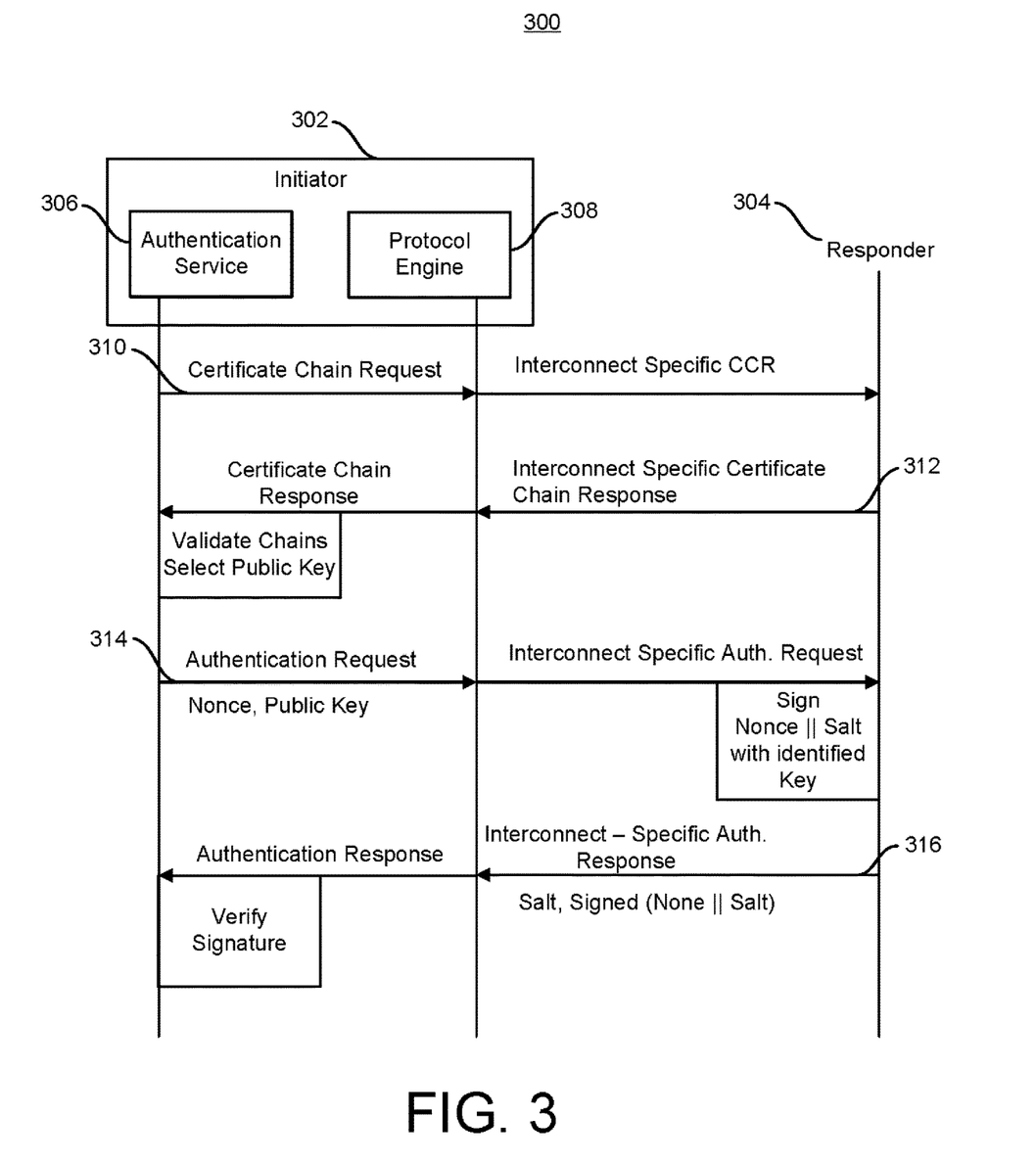
FIG. 3 is a message flow diagram for authenticating a component having firmware.

FIG. 3 is a message flow diagram 300 for authenticating a component having firmware. The message flow diagram 300 may represent a flow of messages between an authentication initiator 302 and a responder 304. The initiator 302 may represent a component, such as the initiator 102, and may include an authentication service 306 and a protocol engine 308. The protocol engine 308 may translate the messages between the initiator 302 and the responder 304 based on the interconnects between the initiator 302 and responder 304. The responder 304 may represent a component having firmware, such as the responder 104. Message 310 represents a request from the initiator 302 for the responder's certificate chain (or chains.) The message 312 represents the certificate chain sent by the responder 304 to the initiator 302 in response to the request. In response to receiving the responder's certificate chain, the initiator 302 may validate one or more of the certificate chains and select the public key to be authenticated by the responder 304. The public key may be selected from the leaf certificate of a valid certificate chain.

Message 314 may represent an authentication request from the initiator 302 to the responder 304. The authentication request may consist of a large random nonce, and the selected public key to be authenticated. In the general case, the public key to be authenticated is identified because the responder 304 may have multiple public-private key pairs used for different purposes.

Once the authentication request is received, the responder's protocol engine may extract the nonce and identity of the public key to be authenticated from the authentication request. Additionally, the responder's signing service may sign a concatenation of the nonce and an internally generated random salt with the private key that corresponds to the identified public key. The purpose of the salt is to protect against chosen plain-text attacks, so it should be unpredictable to the initiator. Message 316 may represent the responder's response to the authentication request containing the salt and the signature over the concatenation of the nonce and salt.

Once the response to the authentication request is received, the initiator 302 may verify that the nonce and salt have been signed by the private key corresponding to the public key in the leaf certificate. If verification is successful, the responder 304 has been authenticated.

Figure 4:
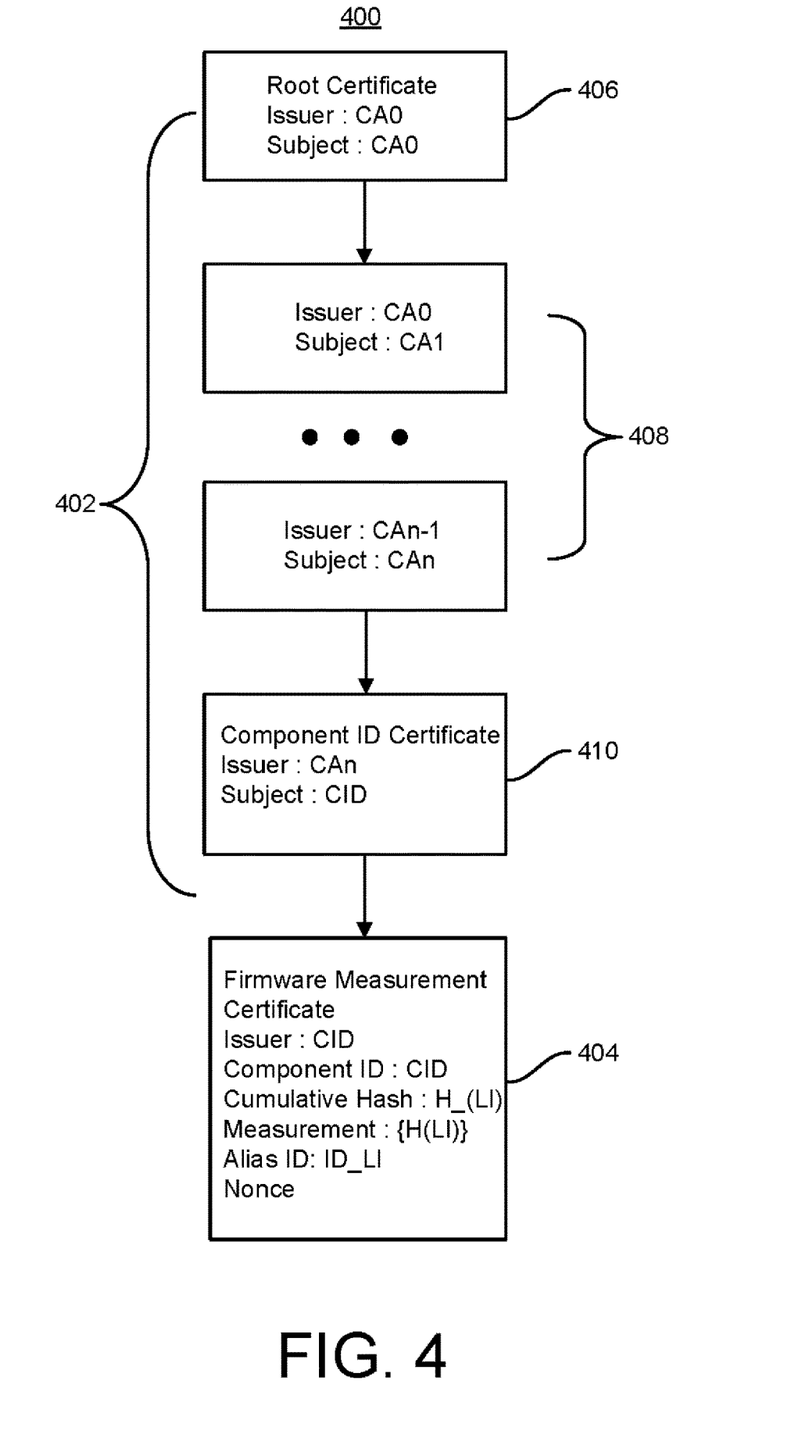
FIG. 4 is an example certificate chain with one mutable layer of firmware.

FIG. 4 is an example certificate chain 400 with one mutable layer of firmware 112. The certificate chain 400 includes static certificates 402 and a firmware measurement certificate 404. The static certificates 402 may be identity certificates that attest to the identity of the manufacturer of the responder 104. Identity certificates may include an issuer and a subject. As stated previously, the issuer may be a name that is associated with a public key. This association is created by an identity certificate that has previously been issued to the issuer by a higher authority in the certificate chain. The subject may represent the owner of the identity certificate. The static certificates 402 may include a root certificate 406, intermediate certificates 408, and a component ID certificate 410. Identity certificates may be issued in the form of a tree structure. Accordingly, the root certificate 406, intermediate certificates 408, and component ID certificate 410 may represent such a structure, with the root certificate 406 representing the top of the tree. The root certificate 406 may be issued and owned by the same certification authority, CA0. In a certificate chain, such as the certificate chain 400, the private key of the root certificate 406 may be used to sign the first of the intermediate certificates 408. Subsequent certificates may thus be signed by preceding certificates. In this way, the intermediate certificates 408 derive their trustworthiness from the root certificate 406.

The component ID certificate 410 may represent a leaf in the tree structure of the static certificates 402, wherein the issuer, $CA_n$, may represent the owner of the last intermediate certificate 408. The component ID certificate 410 may be inserted into the responder 104 during manufacture, thus certifying the responder's identity. The component's public-private key pair may also be created and installed during manufacture, with the private key being stored securely within the responder 104. In contrast, the firmware measurement certificate 404 may be generated dynamically to include as an attribute the cumulative hash of all layers of the firmware 112. Additionally, the firmware measurement certificate 404 may be signed by the private key of the component. Identity certificates and attribute certificates may be generated based on a specific standard, such as the X.509 standard. Under the X.509 standard, there is a bit that may be set for these certificates, referred to as the keyCertSign bit. The keyCertSign bit may indicate that the public key is used for verifying a signature on public key certificates. However, if a malicious user captures the private key of the component ID certificate 410, leaving the keyCertSign bit set may enable the malicious user to set up a counterfeit certification authority deriving trust from the Root CA. Using a counterfeit certification authority may enable the malicious user to produce legitimate certificates for counterfeit components or firmware. As such, in examples, the keyCertSign bit may be cleared in the component ID certificate 410 and the firmware measurement certificate 404.

Once generated, the firmware measurement certificate 404 may be attached as the leaf certificate to the certificate chain 400, which makes the firmware measurement certificate 404 accessible to the authentication initiator 102. In examples, the leaf certificate, i.e., the firmware measurement certificate 404, is authenticated. More specifically, the alias ID key in the attribute certificate issued by the component ID key is authenticated. The component ID is not authenticated directly. Rather, the component ID is an Attribute Authority that issues attribute certificates, i.e., firmware measurement certificates 404, similar to how a certification authority issues identity certificates. Thus, if authentication of the firmware measurement certificate 404 is successful, the identity of the responder is verified. Accordingly, the authentication may provide a signed attestation in the form of an attribute in the firmware measurement certificate 404, the hashes of the firmware 112 that the responder 104 launched, or the cumulative hash 208. Accordingly, the responder 104 can be assured to be authentic, i.e., from a genuine manufacturer. Further, the cumulative hash, $H\_(L_1)$, or measurement $H(L_1)$, may be validated against the expected firmware 122 of the database 134.

As stated previously, the firmware 112 may be implemented in multiple layers. In addition to the layers of the firmware 112, the hardware of the responder 104 may represent a base layer, referenced herein as layer L0. In examples, the layer L0 may be implemented as a combination of immutable firmware and specific hardware logic. The hardware logic may implement security operations similar to those executed by a trusted platform module (TPM), with a limited set of vendor-specific commands. The layer L0 may provide an interface for all layers of the firmware 112 to add to the cumulative hash. Further, the layer L0 may provide an interface to generate the firmware measurement certificate 404. The initiator 102 authenticates the key in the alias ID attribute of the firmware measurement certificate 404. A dynamic key is generated and installed into the firmware measurement certificate 404 of the layer for this purpose. In examples, the layer L0 may represent a trusted immutable layer. The layer L0 may be referred to as immutable because L0 may not be changed. Layer L0 may not be changed because this layer contains or can compute the private key for the component ID 206, referred to herein as CIDK. As an addition to the layer L0, the firmware 112 represented by the firmware measurement certificate 404 is referenced to herein as layer L1. In examples, the private key for the component ID 206 may not be made available to layer L1 or higher.

Figure 5:
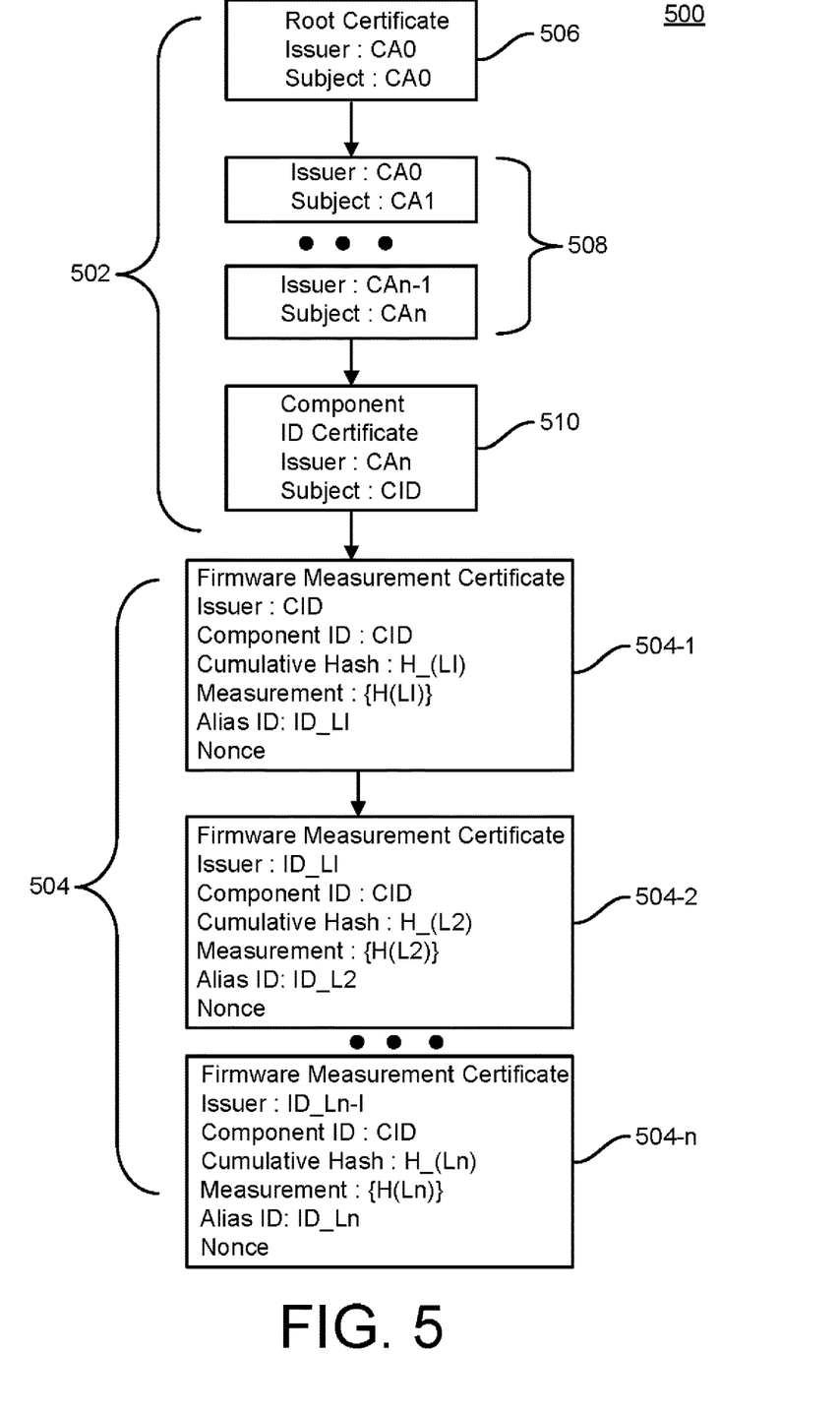
FIG. 5 is an example certificate chain with multiple mutable layers of firmware.

FIG. 5 is an example certificate chain 500 with multiple mutable layers of firmware 112. The certificate chain 500 includes static certificates 502 and multiple firmware measurement certificates 504. The static certificates 502 may be identity certificates that attest to the identity of the manufacturer of the responder 104. The static certificates 502 may include a root certificate 506, intermediate certificates 508, and a component ID certificate 510. The root certificate 506 may be issued and owned by the same certification authority, CA0. In the certificate chain 500, the private key of the root certificate 506 may be used to sign the first of the intermediate certificates 508. Subsequent certificates may thus be signed by preceding certificates. In this way, the intermediate certificates 508 derive their trustworthiness from the root certificate 506. The root certification authority is generally the most trusted, the further you get away from it, the trust is generally considered weaker and the standards for maintaining the key are generally more relaxed.

The component ID certificate 510 may represent a leaf in the tree structure of the static certificates 502, wherein the issuer, $CA_n$, may represent the owner of the last intermediate certificate 508. The component ID certificate 510 may be inserted into the responder 104 during manufacture, thus certifying the responder's identity. The component's public-private key pair may also be created and installed during manufacture, with the private key being stored securely within the responder 104. In contrast, the firmware measurement certificate 504 may be generated dynamically to include as an attribute the cumulative hash of all layers of the firmware 112.

In examples, the firmware 112 may include multiple layers. Accordingly, a firmware measurement certificate 504 may be generated for each layer. For example, firmware measurement certificates 504-1, 504-2, 504-$n$, may be generated for firmware layers L1, L2, and Ln. The firmware measurement certificates 504-1 through 504-$n$ may represent layers L1 through Ln. In examples, the firmware measurement certificates 504-1 through 504-$n$ may include a cryptographic hash of the layers of firmware represented by the firmware measurement certificate 504, instead of a cumulative hash. The component ID may be the same value for all firmware measurement certificates 504 for a particular responder 104. The nonce may also be the same for all firmware measurement certificates 504 for the responder 104. With each power-cycle or reset, a new nonce may be used as the firmware measurement certificates 504 are generated dynamically. The nonce may be provided by the initiator 102 before the power cycle or reset. The nonce may be provided by an external entity for the security of the scheme to hold. This may ensure that the firmware measurement certificates 504 are generated with each reset or power-cycle, and that the core root of trust 124 is behaving correctly.

The new firmware measurement certificate 504 may be appended to the end of the certificate chain 500. The new key, IDn+1 may be installed into the layers Ln+1 and made available to layers Ln+1 to Ln+m, and the old key, ID1, made unavailable to Ln+1 and all higher layers. This may continue through an arbitrary number of layers. Each new firmware measurement certificate 504 may have its own public-private key pair, which is not accessible to the layer of firmware being certified. This means that no firmware layer can tamper with the firmware measurement certificates 504 issued by a previous layer. Thus, if a layer of firmware 112 is faulty or untrustworthy, the faulty or untrustworthy layer may not be able to change the measurement attribute recorded in the firmware measurement certificate 504 for that layer.

In examples, generating a separate firmware measurement certificate 504 for each layer of the firmware 112 may provide some advantages. For example, if each layer, other than the lowest layer, is selected and installed dynamically during initialization into memory locations that are dynamic, it may only be possible to measure the next immediate higher layer before launching the next immediate higher layer. Generating firmware measurement certificates 504 for each layer may also be useful when the lower layers are not restarted, but the upper or last layer is restarted and updated multiple times.

Figure 6:
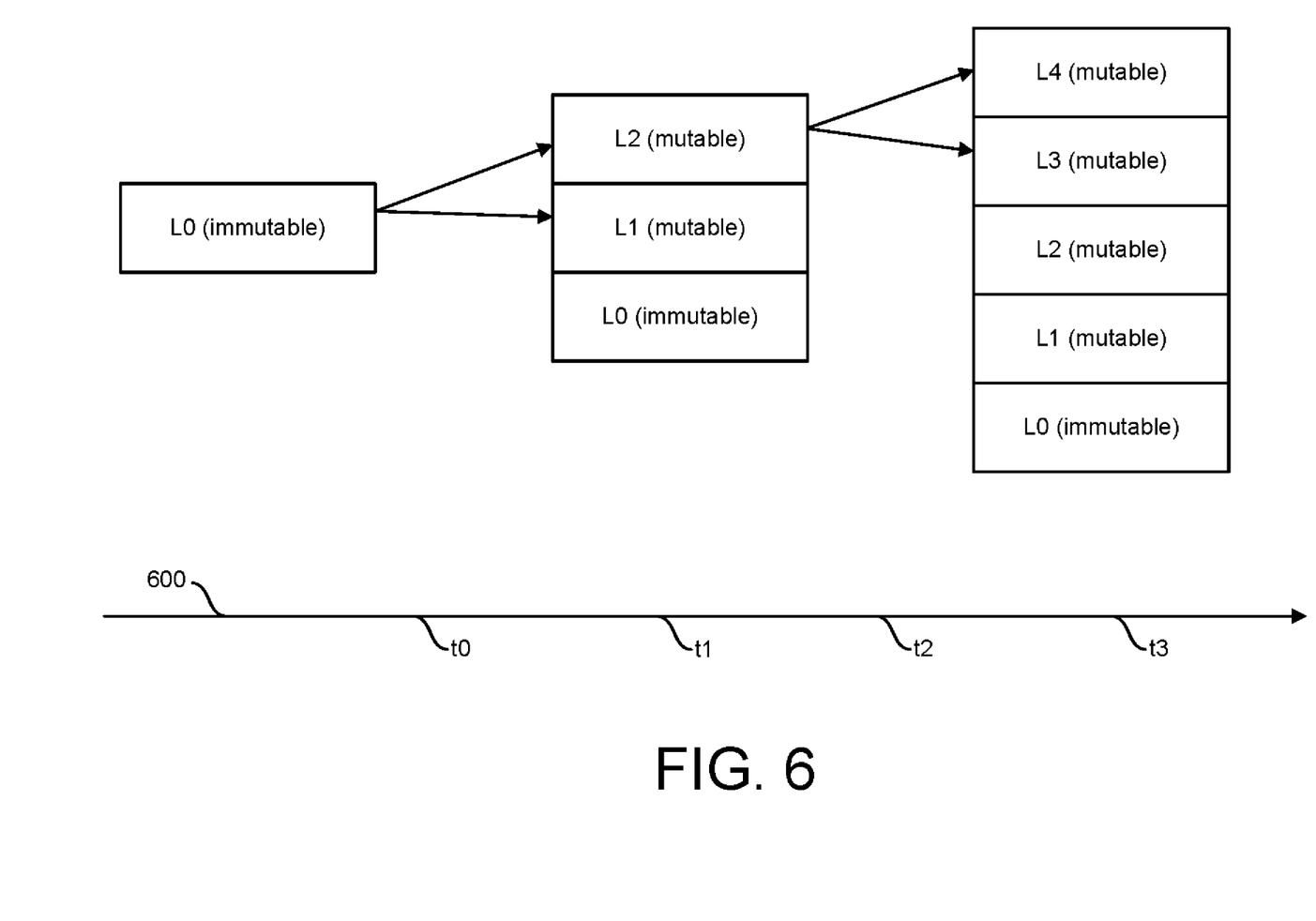
FIG. 6 is an example timeline for securing the firmware of a responder.

FIG. 6 is an example timeline 600 for securing the firmware of a responder. In the timeline 600, the responder 104 is represented by layers L0-L4. Layer L0 may represent the hardware of the responder 104 with a component ID certificate 110. Layers L1-L4 may represent the firmware 112 of the responder 104. In examples, the layers L1-L4 may represent multiple layers of the firmware 112 or independent code blocks. In contrast to firmware layers, which may execute in a prescribed sequence, independent code blocks may be executed by the responder without dependencies. The timeline 600 may include time points, t0, t1, t2, and t3. Time t0 may represent the time when the responder 104 is initialized at power up. At time t0 of the timeline 600, the layer L0, may create a firmware measurement certificate 114 for layers L1 and L2. Time t1 may represent the time after the responder 104 has initialized and before the responder 104 begins operation. At time t1, the initiator 102 may authenticate layers L0 through L2 of the responder.

Time t2 may represent the time when the operating system driver loads the firmware 112 into the responder 104. At time t2, the layer L2 may generate the firmware measurement certificates 114 for layers L3 and L4. Time t3 may represent the time when the responder has begun executing the firmware 112. At time t3, the initiator 102 may authenticate layers L3 and L4 of the responder 104.

Figure 7:
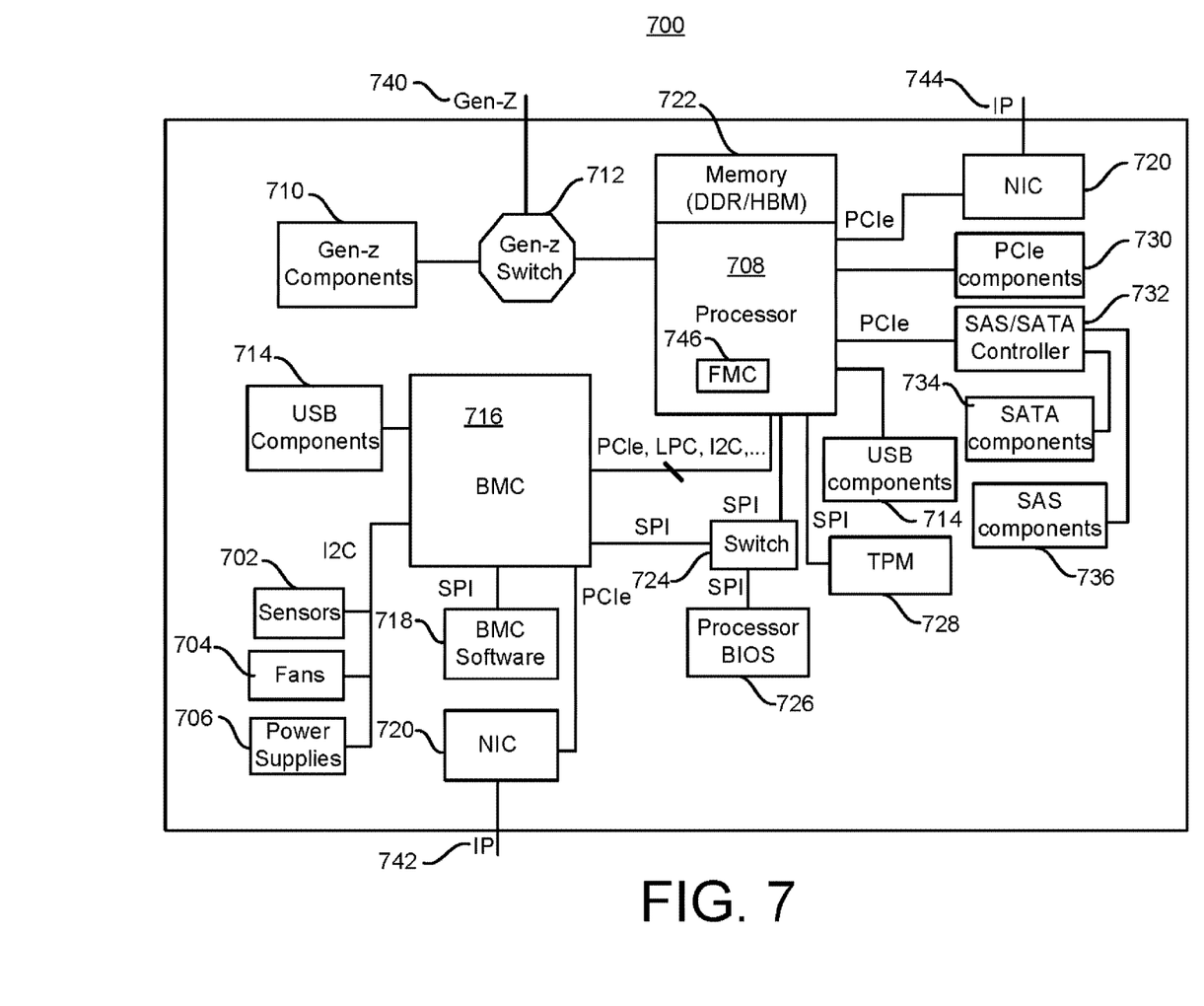
FIG. 7 is an example compute node with multiple components containing firmware to be secured.

FIG. 7 is an example compute node 700 with multiple components containing firmware to be secured. Firmware may be computer instructions that operates the various components of the compute node 700. The components may represent the initiator 102 or the responder 104 described above. In examples, some components may be installed by a manufacturer of the compute node 700. Alternatively, some components may be field replaceable, meaning the components are replaced after purchase of the compute node 700 by installing the components on the compute node 700 when the compute node 700 is powered off. Additionally, some components may be hot-plugged. Being hot-plugged means that the component is physically connected to an interconnect of the compute node 700 while the compute node 700 is powered on. The compute node 700 may include components with a range of capabilities, including components with little to no processing ability, such as sensors 702, fans 704, and power supplies 706, and components with complex processing capabilities, such as, a general-purpose processor 708. Additional components of the compute node 700 may include, for example, Gen-Z components 710, a Gen-Z switch 712, USB components 714, a baseboard management controller (BMC) 716, BMC software 718, multiple network interface controllers (NICs) 720, memory 722, a serial peripheral interconnect (SPI) switch 724. The SPI switch 724 may be in the bus that is used to access read-only memory (ROM). The SPI switch 724 may enable the BMC 716 to check if the general-purpose processor 708 is loading the correct firmware. For example, The SPI switch 724 may enable the BMC 716 to read the basic input output system (BIOS) 726, before the BIOS 726 is loadable by the processor 708. If the BIOS 726 is correct, the BMC 716 may flip the switch to allow the processor 708 to load the BIOS 726. The SPI switch 724 may also enable the BMC 716 to restore or update firmware on the SPI switch 724. Further, the components may include the BIOS 726, a trusted platform module 728, PCIe components 730, a serial attached SCSI (SAS)/SATA controller 732, SATA components 734, and SAS components 736. These components may also be connected over a range of interconnects, including inter-integrated circuit (I2C), PCIe, USB, double data rate (DDR), high bandwidth memory (HBM), and Gen-Z, within the compute node 700. The components of the example compute node 700 may vary, including fewer or additional components. For example, the compute node 700 may include multiple processors 708, or a platform controller hub. Further, the compute node 700 may be one of multiple nodes in rack and cluster-scale systems.

Additionally, one or more of the components of the system 700 may include firmware measurement certificates, which may be used to authenticate that the firmware for the components of the compute node are correct and trustworthy. The hardware and firmware of the components may be authenticated in response to a request from an authentication initiator, also referred to herein as the initiator 102. Examples of initiators may include software or firmware executing on the compute node 700. Such software may include an operating system (not shown) of the compute node 700. The operating system may be one or more computer applications that coordinate the execution of computer instructions on the processor 708, and invokes calls to the firmware of the various components of the compute node 700. The initiator may authenticate a computer component by executing a series of calls to an authentication responder, also referred to herein as the responder 104. The responder 104 refers to the component that the initiator 102 is attempting to authenticate. The processor 708 may represent an example responder 104, which includes a firmware measurement certificate (FMC) 746 that may be used by the initiator 102 to authenticate the firmware of the processor 708.

In examples, the initiator 102 may be running outside the compute node 700, on a rack, cluster, or fabric management system. Authentication initiated from outside of the compute node 700 may take place over a Gen-Z interconnect 740, or IP networks 742, 744. Authentication over IP network 742 may be conducted out-of-band via the BMC 716. Additionally, authentication over IP network 744 may be conducted in-band via the processor 708.

Figure 8:
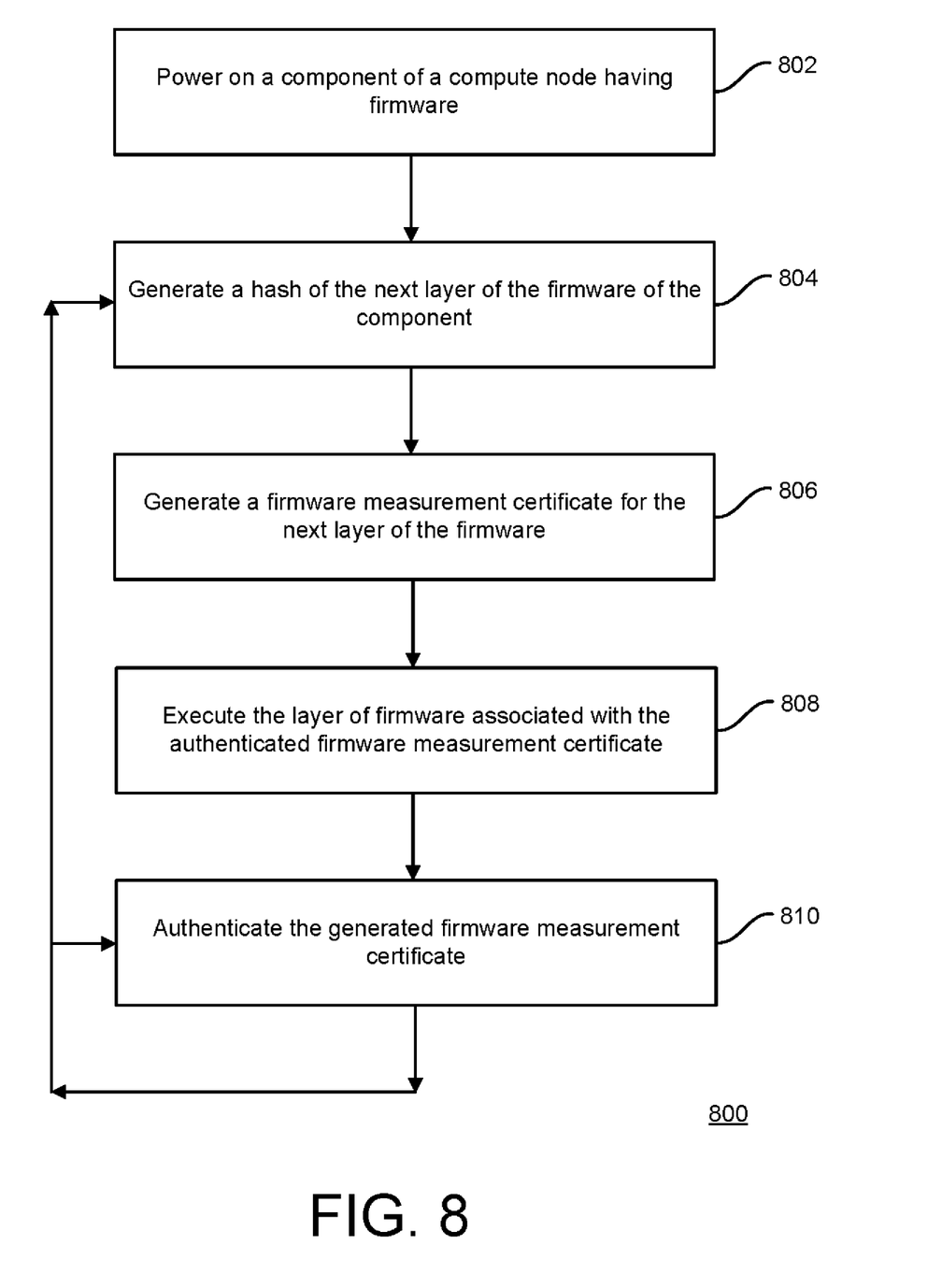
FIG. 8 is a process flow diagram of a method for generating firmware measurement certificates.

FIG. 8 is a process flow diagram of a method 800 for generating firmware measurement certificates. At block 802, a component of a compute node having firmware may power on or commence re-initialization. The component may be a responder, such as the responder 104. An example responder 104 may include any of the components of the compute node 700, such as the processor 708, Gen-Z components 710, and so on. For the purpose of this discussion, one of the PCIe components 730 of the compute node 700 is used as an example component. The PCIe component 730 may power on during a power-cycle of the compute node 700. Alternatively, the PCIe component 730 may power on when the compute node 700 exits a low-power or reset state. A nonce, such as the nonce 138 may also be read from persistent storage. In examples, the nonce 138 may be provided by the initiator 102. For example, the nonce 138 may be provided from a previous authentication request, e.g, authentication request 314. In such an example, the responder 104 may store the nonce 138 in persistent storage within the responder 104. In another example, the initiator 102 may write a nonce 138 into a register in the responder 104. For example, PCIe devices, such as the PCIe component 730 may expose registers which can be read and written over a PCIe bus. The value stored in such a register may persist the nonce 138 across resets or power cycles Additionally, the first layer, L0, of the firmware 112 of the PCIe component 730 may be loaded into memory. As stated previously, the PCIe component 730 may be an example of the responder 104 described with respect to FIG. 1. The PCIe component 730 may be powered on at block 802 by an operating system of the compute node 700. The method 800 may be further performed by a core root of trust of the PCIe component 730, such as the core root of trust 124.

At block 804, a hash may be generated for the next layer of the firmware 112 of the PCIe component 730. For example, after powering on, the layer L0, which may represent the immutable core root of trust 124, may measure layer L1 of the firmware 112. The hash may be a NIST approved hash of the binary image of layer L1.

At block 806, a firmware measurement certificate, such as the firmware measurement certificate 200, may be generated for the next layer of the firmware 112. For example, the core root of trust 124 may generate the firmware measurement certificate 200 for layer L1. The firmware measurement certificate 200 may include an issuer 202, a component ID 206, an alias ID 212, and either a cumulative hash 208 or a measurement 210. The issuer 202 and the component ID 206 may be the component ID of the PCIe component 730. The component ID of the PCIe component 730 may be considered layer L0, which may be considered to be issuing the firmware measurement certificate 200. The alias ID 212 may be a public key that identifies the owner of the firmware measurement certificate 200. The owner of the firmware measurement certificate 200 may be the next layer, layer L1 after power on. The cumulative hash 208 or measurement 210 may be populated based on the hash generated at block 804. The cumulative hash 208 may be determined based on Equation 1. Alternatively, the measurement 210 may be populated with the generated hash. Additionally, the keyCertSign bit for the firmware measurement certificate 200 may be cleared to prevent malicious users from creating counterfeit certification authorities.

In examples, the firmware 112 may include one or more layers. As such, blocks 804-806 may be repeated for each subsequent layer of the firmware 112. However, instead of being performed by the core root of trust 124, the blocks 804-806 may be performed by the current layer of the firmware 112. Thus, layer L0 may generate the firmware measurement certificate 200 for layer L1. Layer L1 may generate the firmware measurement certificate for layer L2, and so on. If the firmware 112 includes one layer, the method 800 may flow to block 808.

At block 808, the layer of the firmware 112 associated with the generated firmware measurement certificate 200 may be executed. Executing the firmware 112 may involve operating the PCIe component 730.

At block 810, an initiator, such as the initiator 102, may authenticate the firmware measurement certificate 200 generated at block 806. The authentication may be performed as described with respect to FIG. 3. If the authentication fails, the method 800 may end. If the firmware measurement certificate 200 is authenticated however, the method 800 execution of the firmware 112 may continue. Further, in some scenarios, the same firmware measurement certificate 200 may be authenticated multiple times. Multiple authentications may be performed if the compute node 700 has not been power cycled, but authentication of the firmware 112 is requested. Additionally, the nonce provided by the initiator 102 during authentication may be written to the PCIe component 730.

In examples, additional firmware measurement certificates 200 may be added after execution of the firmware 112. If the operating system loads additional firmware 112 into the PCIe component 730 shortly after the OS has started, additional firmware measurement certificates 200 may be generated. Additional firmware measurement certificates 200 might also be generated might be if the operating system updates the firmware 112. As such, the method may flow to block 804. In the case of a single firmware measurement certificate 200 for all layers of the firmware 112, the firmware measurement certificate 200 may be updated instead of adding new firmware measurement certificates 200.

In some examples, multiple firmware certificates 200 may be generated in blocks 804-810, one for each layer of the firmware 112. In such examples, the component ID 206 for each firmware measurement certificate 200 may be the component ID of the PCIe component 730. The issuer 202 for such firmware measurement certificates 200 may be the preceding layer of the firmware 112. The alias ID 212 may be a public key that identifies the current layer of the firmware 112. The nonce may be the nonce stored in the PCIe component 730 by the initiator 102. In examples with multiple firmware measurement certificates 200 for one component, such as the PCIe component 730, the cumulative hash 208 may be populated, instead of the measurements 210. The cumulative hash 208, as described with respect to Equation 1, may be a concatenation of the previous layer's cumulative hash and an NIST-approved hash function of the binary image of the current layer.

In some examples, a single firmware measurement certificate 200 may be generated that represents all the layers of the firmware 112. In such examples, instead of generating new firmware measurement certificates 200 for each layer, a new firmware measurement certificate 200 may be issued with an updated signature. This new firmware measurement certificate 200 may replace the previously issued firmware measurement certificate 200. This new firmware measurement certificate 200 may be generated by the current layer of the firmware 112. In the new firmware measurement certificate 200, the component ID 206 and nonce 214 may not be changed. However, the issuer 202 may be the current layer of firmware 112. The alias ID 212 may be a public key that identifies the next layer of the firmware 112. In examples with a single firmware measurement certificates 200 for the PCIe component 730, the measurements 210 may be populated, instead of the cumulative hash 208. Accordingly, the measurements 210 from the previously issued firmware measurement certificate 200 may be supplemented with a new measurement 210 for the next layer of the firmware 112. The measurement 210 may be an NIST-approved hash function of the binary image of the next layer of firmware 112.

It is to be understood that the process flow diagram of FIG. 8 is not intended to indicate that the method 800 is to include all of the blocks shown in FIG. 8 in every case. Further, any number of additional blocks can be included within the method 800, depending on the details of the specific implementation. In addition, it is to be understood that the process flow diagram of FIG. 8 is not intended to indicate that the method 800 is only to proceed in the order indicated by the blocks shown in FIG. 8 in every case. For example, block 804 can be rearranged to occur before block 802.

Figure 9:
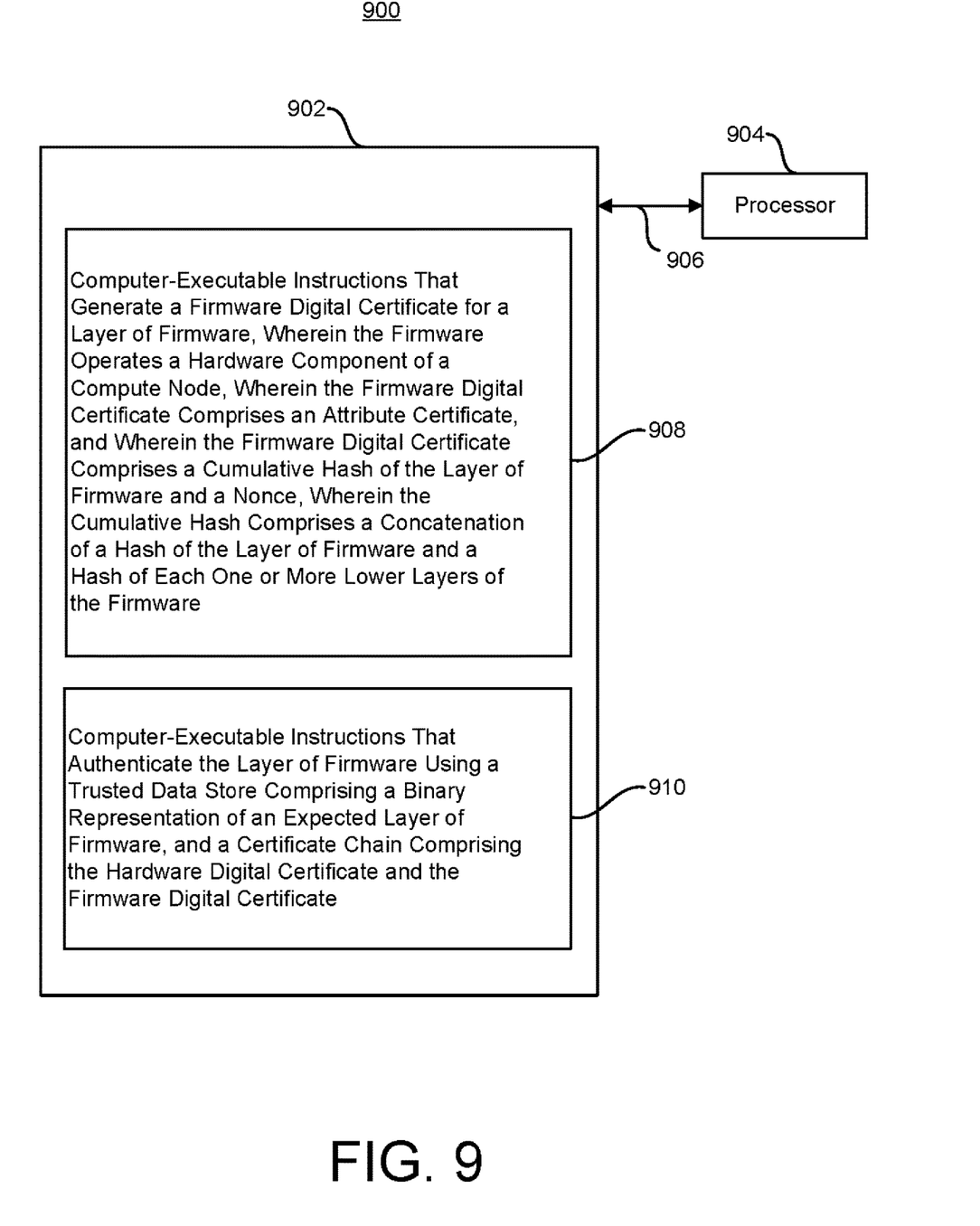
FIG. 9 is an example system comprising a tangible, non-transitory computer-readable medium that stores code for securing firmware.

FIG. 9 is an example system 900 comprising a tangible, non-transitory computer-readable medium 902 that stores code for securing firmware. The tangible, non-transitory computer-readable medium is generally referred to by the reference number 902. The tangible, non-transitory computer-readable medium 902 may correspond to any typical computer memory that stores computer-implemented instructions, such as programming code or the like. For example, the tangible, non-transitory computer-readable medium 902 may include RAM, ROM, EEPROM, CD-ROM or other optical disk storage, magnetic disk storage or other magnetic storage components, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The tangible, non-transitory computer-readable medium 902 can be accessed by a processor 904 over a computer bus 906. The processor 904 may be a central processing unit that is to execute an operating system in the system 900. A region 908 of the tangible, non-transitory computer-readable medium 902 stores computer-executable instructions that generate a firmware digital certificate for a layer of firmware, wherein the firmware operates a hardware component of a compute node, wherein the firmware digital certificate comprises an attribute certificate, and wherein the firmware digital certificate comprises a cumulative hash of the layer of firmware and a nonce, wherein the cumulative hash comprises a concatenation of a hash of the layer of firmware and a hash of each one or more lower layers of the firmware. A region 910 of the tangible, non-transitory computer-readable medium stores computer-executable instructions that authenticate the layer of firmware using a trusted data store comprising a binary image of an expected layer of firmware, and a certificate chain comprising the hardware digital certificate and the firmware digital certificate.

Although shown as contiguous blocks, the software components can be stored in any order or configuration. For example, if the tangible, non-transitory computer-readable medium 902 is a hard drive, the software components can be stored in non-contiguous, or even overlapping, sectors.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for securing firmware, comprising:
  generating a firmware digital certificate for a layer of firmware, wherein the firmware operates a hardware component of a compute node, wherein the firmware digital certificate comprises an attribute certificate, and wherein the firmware digital certificate comprises:
    a cumulative hash of the layer of firmware, wherein the cumulative hash comprises a concatenation of:
      a hash of the layer of firmware; and
      a hash of each one or more lower layers of the firmware; and
    a nonce; and
  authenticating the layer of firmware using a trusted data store comprising a binary image of an expected layer of firmware, and a certificate chain comprising a hardware digital certificate and the firmware digital certificate;
  generating an additional firmware digital certificate for an additional layer of firmware, wherein the additional firmware operates the hardware component of the compute node, wherein the additional firmware digital certificate is signed by a private key installed in a previous layer of firmware, and wherein the additional firmware digital certificate comprises:
    an additional hash of the additional layer of firmware;
    an additional cumulative hash with the additional layer of firmware added to the accumulation; and
    a new key pair with a new private key installed in the additional layer of firmware; and
  authenticating the additional layer of firmware using the trusted data store comprising an additional binary image of the additional layer of firmware, wherein the certificate chain comprises the additional firmware digital certificate.

2. The method of claim 1, wherein the firmware digital certificate for a first layer of the firmware is signed with a private key of the hardware digital certificate for the hardware component.

3. The method of claim 1, comprising signing the firmware digital certificate with the private key of the hardware digital certificate.

4. The method of claim 1, wherein the firmware digital certificate comprises a plurality of measurements of a corresponding plurality of layers of the firmware, wherein each of the measurements comprise a hash of a binary image of a corresponding layer of the firmware.

5. The method of claim 1, wherein the firmware digital certificate is generated based on an X.509 standard.

6. The method of claim 1, wherein the additional firmware certificate comprises:
  an additional cumulative hash comprising an additional concatenation of:
    a cryptographic hash of the layer of firmware; and
    an additional cryptographic hash of the additional layer of firmware;
  the nonce; and
  an alias ID.

7. The method of claim 1, wherein an initiator provides the nonce to the responder.

8. A system, comprising:
  a processor; and
  a memory component that stores instructions that cause the processor to:
    generate a firmware digital certificate for a layer of firmware, wherein the firmware operates a hardware component of a compute node, wherein the firmware digital certificate comprises an attribute certificate, and wherein the firmware digital certificate comprises:
      a cumulative hash of the layer of firmware, wherein the cumulative hash comprises a concatenation of:
        a hash of the layer of firmware; and
        a hash of each one or more lower layers of the firmware; and
      a nonce; and
    authenticate the layer of firmware using a trusted data store comprising a binary image of an expected layer of firmware, and a certificate chain comprising a hardware digital certificate and the firmware digital certificate;
    generate an additional firmware digital certificate for an additional layer of firmware, wherein the additional firmware operates the hardware component of the compute node, wherein the additional firmware digital certificate comprises an additional hash of the additional layer of firmware, wherein the additional firmware digital certificate is signed by a private key installed in a previous layer of firmware, and wherein the additional firmware digital certificate comprises:
      an additional hash of the additional layer of firmware;
      an additional cumulative hash with the additional layer of firmware added to the accumulation; and
      a new key pair with a new private key installed in the additional layer of firmware; and
    authenticate the additional layer of firmware using the trusted data store comprising an additional binary image of the additional layer of firmware, wherein the certificate chain comprises the additional firmware digital certificate.

9. The system of claim 8, wherein the firmware digital certificate for a first layer of the firmware is signed with a private key of the hardware digital certificate for the hardware component.

10. The system of claim 8, wherein the instructions cause the processor to sign the firmware digital certificate with the private key of the hardware digital certificate.

11. The system of claim 8, wherein the firmware digital certificate comprises a plurality of measurements of a corresponding plurality of layers of the firmware, wherein each of the measurements comprise a hash of a binary image of a corresponding layer of the firmware.

12. The system of claim 8, wherein the firmware digital certificate is generated based on an X.509 standard.

13. The system of claim 8, wherein the additional firmware certificate comprises:
  an additional cumulative hash comprising an additional concatenation of:
    a cryptographic hash of the layer of firmware; and
    an additional cryptographic hash of the additional layer of firmware;
  the nonce; and
  an alias ID.

14. The system of claim 8, wherein an initiator provides the nonce to the responder.

15. A non-transitory, computer-readable medium storing computer-executable instructions, which when executed, cause a computer to:
   generate a firmware digital certificate for a layer of firmware, wherein the firmware operates a hardware component of a compute node, wherein the firmware digital certificate comprises an attribute certificate, and wherein the firmware digital certificate comprises:
      a cumulative hash of the layer of firmware, wherein the cumulative hash comprises a concatenation of:
         a hash of the layer of firmware; and
         a hash of each one or more lower layers of the firmware;
      a plurality of measurements of a corresponding plurality of layers of the firmware, wherein each of the measurements comprise a hash of a binary image of a corresponding layer of the firmware; and
      a nonce;
   generate an additional firmware digital certificate for an additional layer of firmware, wherein the additional firmware operates the hardware component of the compute node, wherein the additional firmware digital certificate is signed by a private key installed in a previous layer of firmware, and wherein the additional firmware digital certificate comprises:
      an additional hash of the additional layer of firmware;
      an additional cumulative hash with the additional layer of firmware added to the accumulation; and
      a new key pair with a new private key installed in the additional layer of firmware;
   authenticate the layer of firmware using a trusted data store comprising a binary image of an expected layer of firmware, and a certificate chain comprising a hardware digital certificate and the firmware digital certificate; and
   authenticate the additional layer of firmware using the trusted data store comprising an additional binary image of the additional layer of firmware, wherein the certificate chain comprises the additional firmware digital certificate.

16. The non-transitory, computer-readable medium of claim 15, wherein the firmware digital certificate for a first layer of the firmware is signed with a private key of the hardware digital certificate for the hardware component.

17. The non-transitory, computer-readable medium of claim 15, wherein the computer-executable instructions, when executed, cause the computer to sign the firmware digital certificate with the private key of the hardware digital certificate.

18. The non-transitory, computer-readable medium of claim 15, wherein the firmware digital certificate is generated based on an X.509 standard.

* * * * *